United States Patent [19]

Champion

[11] Patent Number: 5,492,385
[45] Date of Patent: Feb. 20, 1996

[54] AUTOMOBILE ROOF HARNESS

[76] Inventor: Daniel E. Champion, 25303 Wells Ct., Stevenson Ranch, Calif. 91381

[21] Appl. No.: 383,109

[22] Filed: Feb. 3, 1995

[51] Int. Cl.$^6$ .............................. A45F 5/10; B65D 63/18
[52] U.S. Cl. .......................... 294/157; 294/150; 294/165
[58] Field of Search ............................ 294/74, 149, 150, 294/153–155, 157, 165; 296/218

[56]  References Cited

U.S. PATENT DOCUMENTS

| 1,187,496 | 6/1916 | Bullock | 294/155 |
|---|---|---|---|
| 1,663,708 | 3/1928 | Keeler | 294/149 |
| 1,847,501 | 3/1932 | Stahler | 294/157 |
| 4,600,177 | 7/1986 | Fritz | 294/74 |
| 5,297,835 | 3/1994 | Wengler | 294/157 |
| 5,368,353 | 11/1994 | Flanders et al. | 294/165 |

*Primary Examiner*—Dean Kramer
*Attorney, Agent, or Firm*—Graham & James

[57]  ABSTRACT

A harness for removing automobile roof panels such as targa tops and removable hard tops can include a pair of straps having fastening mechanisms disposed on ends thereof. The fastening mechanisms enable an individual to securely fit the harness about the removable roof panel. The harness is provided with a selectively positionable handle which the user is able to grab and obtain proper leverage when removing the roof panel. The fastening mechanisms are adjustable to allow each strap to be wrapped around the roof panel, connected together, and tightened. When both straps have been tightened with the handle at the selected position on the top of the roof panel, the panel can be lifted from the vehicle with one hand using the handle and the other hand serving as a pivot point.

11 Claims, 3 Drawing Sheets

FIG. 4
FIG. 5
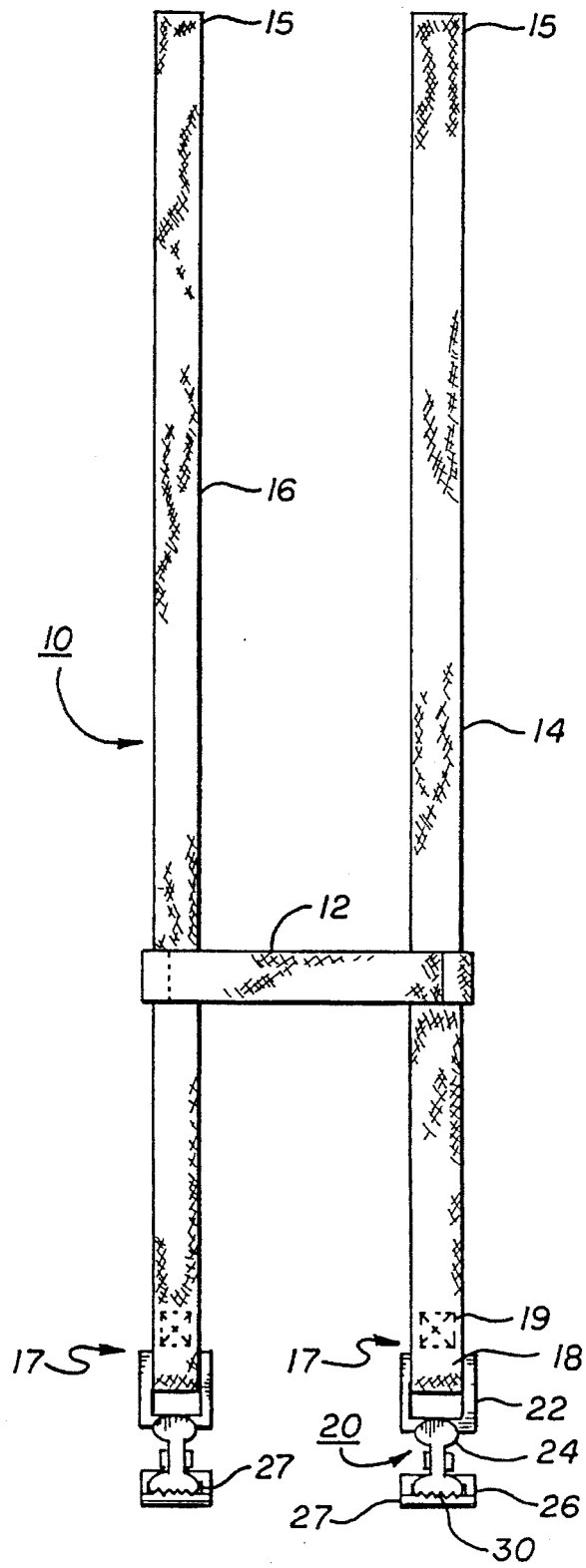
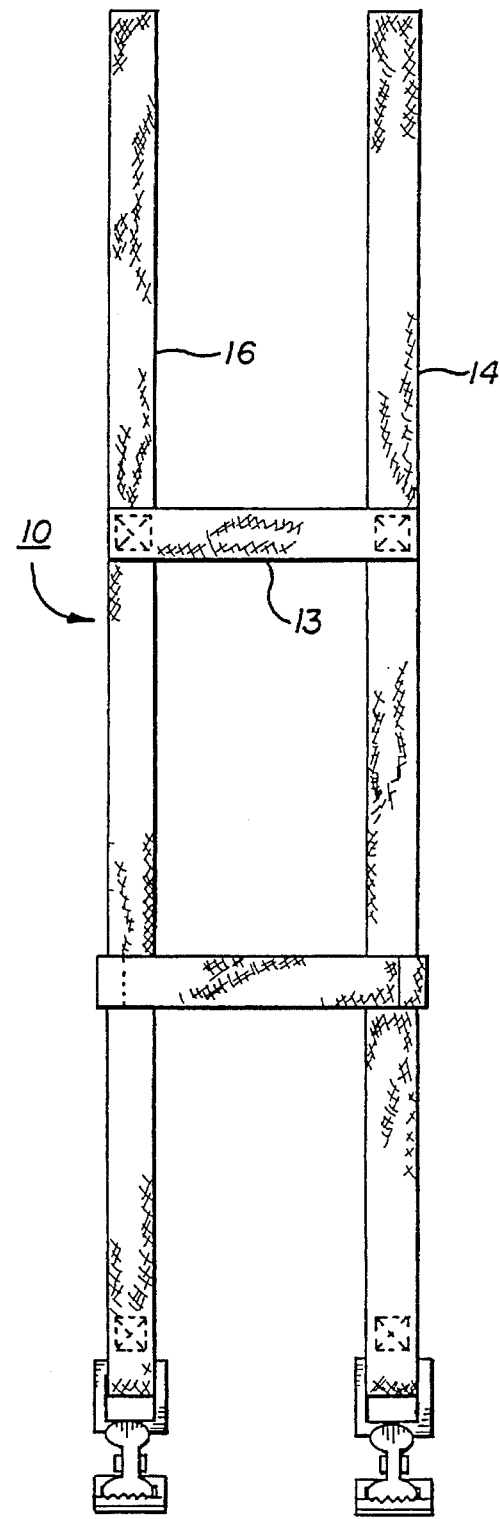

AUTOMOBILE ROOF HARNESS

FIELD OF THE INVENTION

The present invention relates to automobile roof tops. In particular, the present invention relates to a method and apparatus for easily and efficiently handling removable automobile roof tops such as targa tops, removable hard tops, and removable glass tops.

BACKGROUND OF THE INVENTION

Many people are familiar with automobiles that allow for the removal of all or a portion of the roof. Cars having such roofs are known as convertibles, cabriolets, T-tops, etc. Previously, automobiles with such roofs had a tendency to leak or were subject to excessive wind noise when the removable portions of the roof were in place on the car. Further, without the solid roof structure, car manufacturers had trouble providing such cars with sufficient structural rigidity to accommodate stresses placed on the car when driving, thus resulting in a decrease in automobile performance.

Open air driving with all or part of the roof removed has enjoyed renewed popularity due, in part, to improvements in manufacturing and quality. New manufacturing techniques and metals enable auto makers to produce high performance automobiles with fully or partially removable roofs. This has led to an increased interest in automobiles with convertibles, T-tops, and targa tops. Each of these types of vehicles allows for the removal of all or a portion of the roof.

Targa tops are often the most difficult of the removable roofs to remove because a targa top is a large rigid panel comprising most of the roof of the vehicle. The panel is generally made of metal, glass, and/or plastic. Targa tops tend to be constructed in a heavy duty fashion to provide sufficient strength to serve as the roof of the vehicle. As such, a targa top tends to be heavy and, unlike a T-top which has multiple panels, is removed from the vehicle in one piece. T-tops, on the other hand, generally have two removable panels which are smaller and more easily handled by an individual.

It is often difficult for one person to remove a targa top because the entire panel must be removed from the vehicle at the same time without damaging the panel or the vehicle in the process. The weight and size of the roof make such a task difficult for one person. The instant inventor has found that in order for a single person to remove a targa top readily, one must stretch both arms over the center of the vehicle, grab the removable panel from both sides, and lift. The positioning and movement required in order for an individual to accomplish this task, however, places strain on the back and other parts of the body which could, conceivably, lead to an injury. Certain individuals who lack upper body strength or who have had prior back injuries, back pain or muscle strain, would find such a task virtually impossible due to the weight of the roof and the positioning and movement required to accomplish removal of the same.

A prior art device for assisting in the removal of an automobile hard top is known. U.S. Pat. No. 4,600,177 ("the '177 patent") is directed to a method of hoisting an automobile hard top. The '177 patent uses a hoist system including a winch which is permanently attached to a rigid wall structure such as a side wall of a garage. A cable connected to the winch is then fed to a pulley which is permanently mounted in the ceiling of the garage. The cable is lowered from the ceiling using the winch to a position above the removable hard top. A strap is then affixed to the hard top and it is connected to the cable. The winch is then employed to raise the cable and, thus, the hard top.

The system of the '177 patent has several limitations. First, it is a permanently mounted system and, as such, must be utilized in the owner's home. Second, the user must have a garage or other suitable place to install such a system. Third, the system is complicated and, by its very nature, cannot be easily transported from place to place. Fourth, while such a heavy duty system may be required for removal of an entire roof assembly such as the hard top pictured in the '177 patent, given the relatively lighter weight of targa tops when compared to hard tops, a heavy duty system is not required in most instances. Fifth, the system is inflexible in that a driver does not have the option of taking the roof off or putting it back on after the driver has left the home where the system is installed. Sixth, such system is costly to manufacture and purchase, and requires time and some skill to install.

Other devices are known for carrying awkward or odd-shaped articles. For example, U.S. Pat. No. 5,169,199 (the "'199 patent") is directed to an object carrier which comprises a single strap provided with a grip and having a hook and fabric type fastener. The strap is placed around the object to be carried and is secured using the fastener. The user then uses the grip to carry the object. U.S. Pat. Nos. 4,804,218 (the "'218 patent") and 4,724,989 (the "'989 patent") are directed to a scuba tank harness and a sailboard carrying apparatus, respectively. The '218 patent discloses a harness for carrying scuba tanks that includes a pair of straps which are designed to wrap about the circumference of the scuba tanks. A pair of support straps are attached to the circumferential straps and a pair of handle members are connected to the circumferential straps. A shoulder strap is also provided which can attach to the circumferential straps. The '989 patent discloses a carryall for a sailboard that uses a pair of loops which extend from an extended, cylindrically shaped carrier bar for holding the sailboard. Other loops and straps are connected with the carrier bar and are provided for carrying the mast and boom of the sailboard. A handle is attached to the carrier bar to enable the user to carry the sailboard with the device.

The '199, '218 and '989 patents do not disclose devices, for removing or installing removable portions of an automobile roof. The '218 and '989 patents disclose object-specific carrying apparatus used to carry items have a particular body configuration. The '199 patent uses a single strap to carry objects. However, where an object to be carried must be manipulated and moved in a variety of positions, the use of a single strap may result in instability. Further, unless the strap is installed in a position which correctly balances the load, the object can fall out of the strap, or the strap can slip off the object.

Accordingly, there is a need for a device which can be easily and safely employed by an individual to assist in the removal and installation of a roof panel of an automobile that protects the user from injury, that is inexpensive both to manufacture and purchase, and that can be easily carried with the user from place to place. Further, such a system must be usable by a broad range of people, thus it must be simple to use, require no permanent installation, and require little or no time to learn how to use.

SUMMARY OF INVENTION

The present invention solves the problems with prior art roof removal systems and achieves the above and other objects by providing an adjustable harness that is used to wrap around the targa top. The harness includes a handle that, once the harness is in place on the roof panel and secured, is positioned at a desirable location on the roof panel to afford an individual leverage when removing the panel. An individual can use a single hand to grasp the handle, thus allowing the individual to remain substantially upright when grasping the roof panel with only one arm stretched away from the body. The other hand can be used as a brace or pivot point against which the roof panel can be pressed. Thus, with the single hand on the handle, the entire roof panel can be lifted without placing undue strain on the individual's back.

The device of the present invention can be easily folded and stored in the trunk or glove box of a vehicle, thus providing the driver with the flexibility of being able to decide where and when to remove the roof panel. Once the panel is removed and stored in an appropriate location (e.g. the trunk of the vehicle), the harness can be removed, folded and re-stored in the trunk or glove box, or left installed on the roof panel, in case the driver wishes to reinstall the panel at a later time.

The above and other objects and advantages of the present invention will be more clearly understood upon a reading of the detailed description of the present invention taken in conjunction with the drawings, of which the following is a brief description:

BRIEF DESCRIPTION OF THE DRAWINGS

FIG. 4 is a top plan view of a first embodiment of the present invention; and

FIG. 5 is a top plan view of a second embodiment of the present invention.

DETAILED DESCRIPTION OF THE PREFERRED EMBODIMENTS

Figure 1:
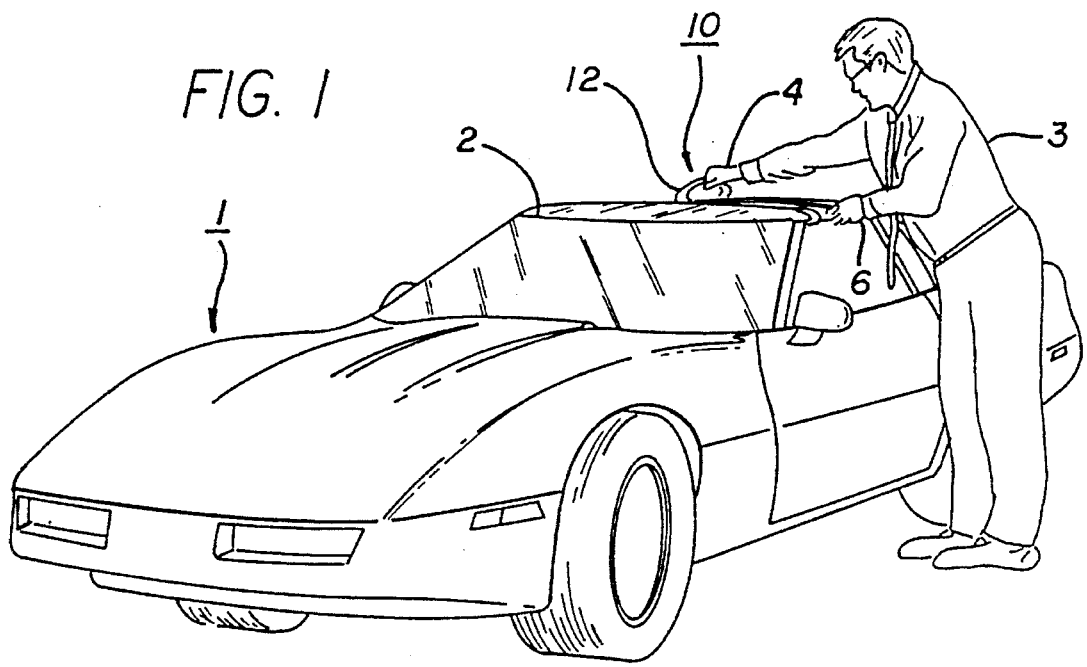
FIG. 1 is a perspective view showing the device of the present invention installed on an automobile.

In the following detailed description, like reference numerals refer to like elements. It should be understood that the drawings illustrate a presently contemplated preferred embodiment of the present invention, but that the present invention is in no way limited to the illustrated embodiments. Rather, the present invention is best defined by the claims appended hereto.

Figure 2:
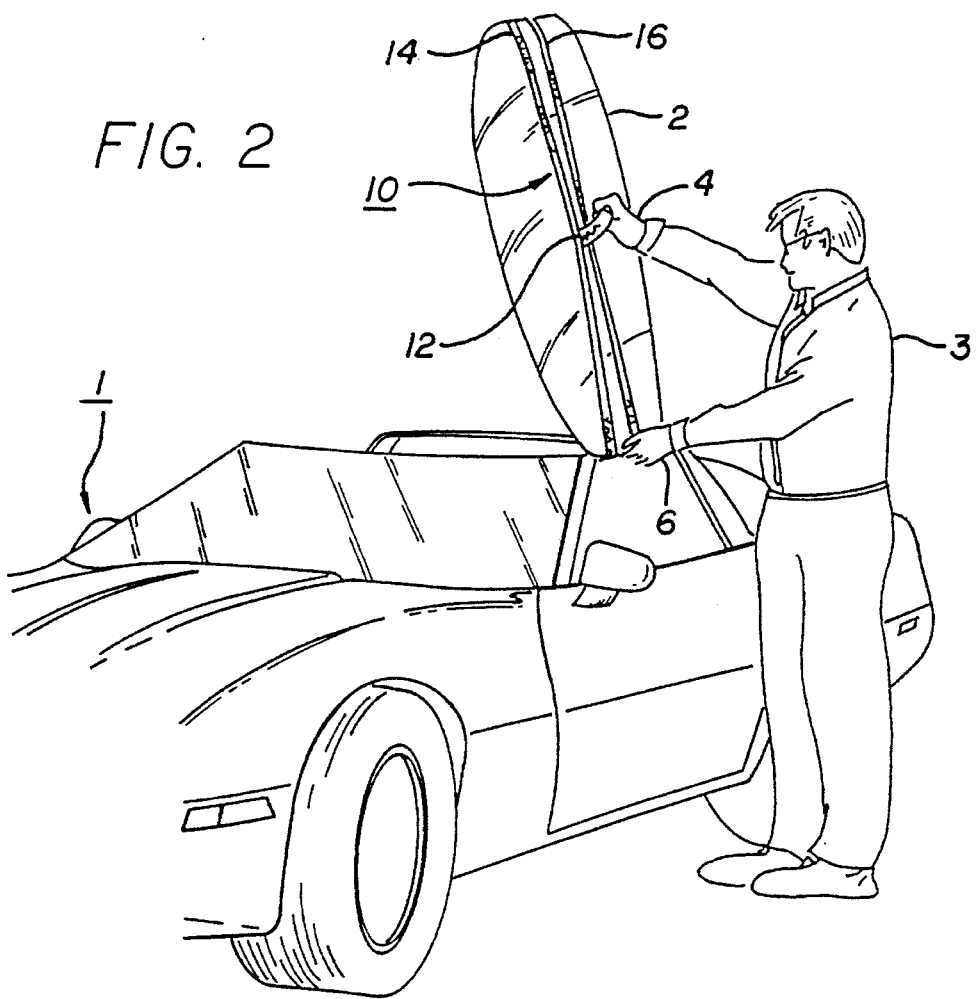
FIG. 2 is a partial perspective view showing the device of the present invention being used to remove a roof panel of an automobile.

FIGS. 1 and 2 illustrate the application of the present invention to the removal of a roof panel 2 from a car 1 by an individual 3. The automobile roof harness 10 of the present invention includes a handle 12 which is positioned on an upper surface of the roof panel 2 when the harness 10 is installed on the car 1. The individual uses one hand 4 to grasp the handle 12 and the other hand 6 to grasp a side surface of the roof panel 2. The hand 6 serves as a pivot point or brace which, in conjunction with the grasping of the handle 12, provides the individual 3 with leverage to allow the individual to remove the roof panel 2 as seen FIG. 2.

Referring in more detail to FIG. 2, it is seen that the automobile roof harness 10 of the present invention incorporates a plurality of straps 14, 16 which are connected by the handle 12. The straps are spaced a sufficient distance apart, preferably six to twelve inches, to provide stability when the individual 3 raises the roof panel 2 as seen in FIG. 2. The straps 14, 16, and direct connect element 13 are preferably ½ to one and ½ inches wide, with the preferred width being one inch. The handle 12 and direct connect element 11 are preferably one to two inches wide, with the preferred width being one and ½ inches wide. The straps 14, 16 are also preferably formed in eight foot lengths to fit around a wide variety of removable roof panels having different dimensions. Of course, it is possible to tailor the length of the straps 14, 16 to fit a particular make of automobile.

Figure 3:
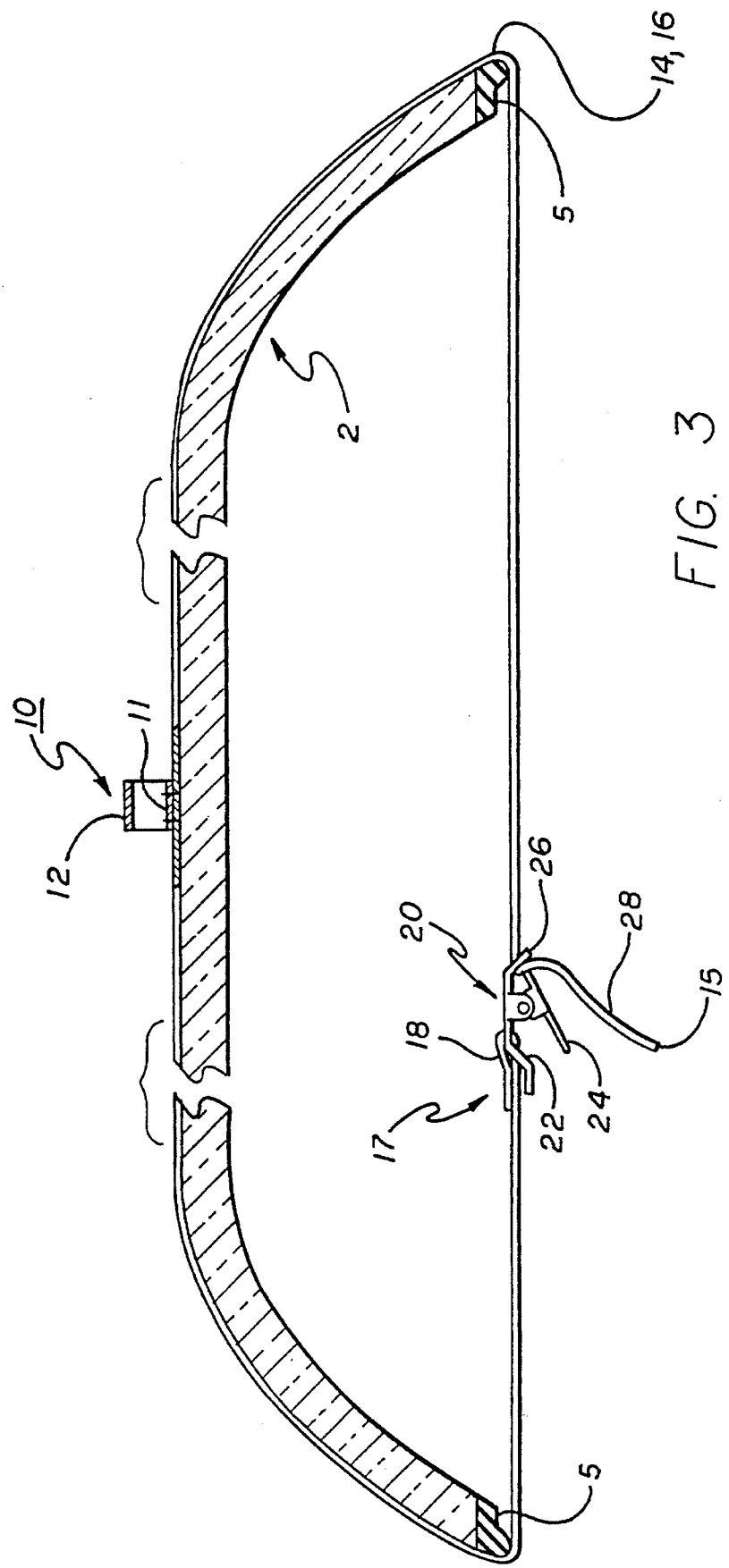
FIG. 3 is a cross-sectional view of a roof panel of an automobile with the device of the present invention installed thereon.

Referring to FIG. 3, a cross-sectional side view of the roof panel 2 with the automobile roof harness 10 installed thereon is illustrated. In particular, it is seen that the automobile roof panel 2 is typically provided with weather stripping 5 along either side thereof. The weather stripping 5 meets with the side windows of the vehicle to provide a weather tight and wind resistant fit when the windows are in the up position. As is known, weather stripping 5 is typically formed of a rubber, polyurethane, or other pliable, water resistant material in order to provide the weather tight fit between the window and the roof panel 2. When the automobile roof harness 10 of the present invention is installed on the roof panel 2, the straps 14, 16 of the harness 10 wrap completely about the roof panel 2. When the straps 14, 16 are tightened, as will be described in more detail hereinbelow, the automobile roof harness 10 of the present invention is held in place due, in part, to the frictional fit between the straps 14, 16, and the pliable weather stripping 5. The pliable, water resistant properties of the weather stripping 5 provide slip resistant surfaces which generally hold the harness 10 with sufficient frictional force to resist slipping when the individual 3 removes the panel 2 from the vehicle as shown in FIG. 2.

While the preferred embodiment does not incorporate any coatings on the straps 14, 16, for vehicles which do not have sufficient weather stripping 5 along the lateral edges thereof it is possible to coat portions of the straps 14, 16 with rubber to provide for a sufficient frictional fit between the straps 14, 16 and the roof panel 2.

As can be seen in FIG. 3 and in more detail in FIG. 4, the preferred embodiment of the present invention incorporates two straps 14, 16 which are connected via a handle 12. Each strap, 14, 16 includes a free end 15 and a fastener end 17. As seen in the cross sectional view shown in FIG. 3, the fastener end 17 of the straps 14, 16 each incorporates a loop connection 18 which is formed by folding over a portion of the material at the fastener end 17 of the straps 14, 16 and stitching the folded-over end together with the main body of the straps 14, 16 in a stitch connection 19 as seen in FIG. 4. The thread which is used in the stitch connection 19, as well as all other stitching in the automobile roof harness 10 shown in the FIGURES, is preferably a polyester/cotton blend, nylon or other suitably strong threads. The preferred stitch used in all connections in the harness 10 is a "boxed X" stitch which can be seen in FIGS. 4 and 5 where the stitch is sewn to form an "X" within a box which surrounds the "X".

In addition to stitching, those skilled in the fabric art will appreciate that it is possible to join the material forming the loop connections 18, as well as the connections used in the handle 12 which are discussed in more detail below, using other suitable joining techniques. For example, nylon may be joined using suitable adhesives or bonding agents, or using heat. In addition, rivets may be used to join material, such as is known in the manufacture of denim clothing. However, to avoid scratching the roof panel 2, it is preferable to use stitching or adhesives in the harness 10.

The material which is utilized to make the automobile roof harness 10, including the straps 14, 16, is preferably a soft nylon or nylon blend material (or "webbing" as it is known in the fabric industry), or other suitable lightweight yet durable material, which is pliable and can be stitched and formed into any desired shape. Nylon can be manufactured in either a smooth or coarse configuration. For the straps 14, 16, the smooth configuration is preferable. The handle 12 can be made from either the smooth or coarse configuration. However, the material which is utilized is preferably a non-stretch material in order to avoid lending instability when the individual 3 is attempting to remove the roof panel 2 from the car 1.

While it is certainly possible to manufacture the automobile roof harness 10 from rubber or other resilient material, the material should be chosen such that the modulus of elasticity is sufficient to allow the harness 10 to support the weight of the roof panel 2 when the harness 10 is installed in the position shown in FIGS. 1 and 2.

Referring again to FIGS. 3 and 4, the free ends 15 and the fastener ends 17 of the straps 14, 16 are connected by way of a clamp 20. The clamp 20 includes an eyelet 22 which serves to engage the loop connection 18 on the fastener end 17 of the straps 14, 16. The clamp 20 is held in place through the stitch connection 19 which forms the loop connection 18 at the fastener end of the straps 17. The clamp 20 incorporates a spring biased clamping arm 24 having a plurality of gripping teeth 30 formed on one end thereof. A strap receiving member 26 includes an opening 27 through which the straps 14, 16 are fed as seen in FIG. 3. After the straps 14, 16 are fed through the strap receiving member 26, a portion 28 of the straps 14, 16 remains hanging and is used by the individual 3 in order to apply sufficient tension on the straps 14, 16 to provide a snug fit about the roof panel 2.

Specifically, the individual 3 pulls on the loose end of the strap 28 after it is passed through the strap receiving member 26, and the gripping teeth 30 on the end of the spring biased clamping arm 24 prevent the strap from loosening. In order to remove the straps 14, 16, the individual 3 simply pulls on the loose end 28 of the straps 14, 16, and then presses down on the spring biased clamping arm 24, thus disengaging the gripping teeth 30 from the straps 14, 16. This enables the loose end 28 of the straps 14, 16 to pass through the strap receiving member 26, thus disengaging the straps 14, 16 from the clamp 20. The clamp 20 illustrated in FIGS. 3 and 4 should be well known to one skilled in the clamp art.

It should be understood that while the drawings illustrate the preferred clamping mechanism, any suitable clamping/fastening mechanism can be utilized in the present invention. Other possible fastening techniques include, but are not limited to: using a Velcro fastening strip on one of the ends of the straps 14, 16 together with an eyelet or ring on the other end of the straps (or other suitable Velcro configurations); using a male/female plastic connector such as those which are popularly used on hiking and other sporting equipment (e.g. backpacks, etc.); or a standard belt buckle-like connector with holes formed in the straps 14, 16 on one end thereof with the belt buckle being disposed on the other ends thereof.

Referring to the handle 12 seen in FIGS. 3 and 4, the handle 12 is generally comprised of the same material as the straps 14, 16 but is provided in a looped fashion as seen in the cross-sectional view in FIG. 3. Specifically, the handle 12 includes a direct connecting member 11 which passes between straps 14, 16 in a manner similar to element 13 seen in FIG. 5, and the loop portion 12 seen in the top-view of FIGS. 4 and 5 which extends between straps 14, 16 but which is longer than the direct connect portion to provide sufficient spacing from the direct connecting member 11 in order to enable an individual 3 to insert a hand 4 therebetween in order to grasp the automobile roof harness 10. The direct connect member 11 and the handle 12, which are generally formed from a single length of material formed into a loop, are connected to straps 14, 16 using a standard stitching technique.

Of course, those skilled in the art will appreciate that it is possible to provide a cushioning layer on the handle 12 to make the lifting of the roof panel easier on the hand of the person using the harness 10. It is also possible to employ a rod sized approximately the same length as the spacing between the straps 14, 16 in the handle 12. Such a rod would incorporate a cylindrical opening into which the material forming the handle 12 can be inserted prior to stitching the handle 12 to the straps 14, 16, such that the handle 12 will include the rod as a rigid handle as opposed to the soft fabric handle illustrated in the drawings.

Referring to FIG. 5, an alternative embodiment of the present invention is illustrated in which a second direct connect member 13 is provided between the parallel straps 14, 16 in order to provide for uniform spacing therebetween. While the provision of the additional direct connect member 13, which is substantially identical to the direct connect member 11 seen in FIG. 3, may assist an individual who is attempting to remove a removable hard top such as that which is found on, for example, a Mazda Miata, and other like-styled sports cars, the instant inventor has found that the additional direct connect member 13 is not necessary when removing a standard targa top roof panel 2 such as that seen in FIGS. 1 and 2 and which is typically found on a Chevrolet Corvette, Honda del Sol, and other similar vehicles.

From the above discussion, it is seen that the present invention provides a simple, efficient, cost effective and portable apparatus for providing an individual 3 with a way to remove a roof panel 2 from an automobile 1. To install the automobile roof harness 10 of the present invention, the user simply lays the harness 10 over the roof panel 2 of the vehicle 1 with the side windows rolled down such that the free ends 15 and fastener ends 17 hang on either side of the vehicle 1 adjacent the side windows. The user then enters the vehicle and connects the free ends 15 of the straps 14, 16 to the respective clamps 20 which are disposed on the fastener end 17 of the straps 14, 16. The free ends 15 of the straps 14, 16 are fed through the strap receiving members 26 and are pulled to provide sufficient tension on the straps 14, 16 to securely hold the roof panel 2.

After the user has connected both straps 14, 16 to a respective clamp 20, tightened the straps 14, 16 by pulling on the loose ends 28 extending through the strap receiving members 26, and released any locking mechanism holding the roof panel 2 in place on the car 1, the user exits the vehicle 1 and proceeds to grasp the handle 12 with one hand 4 while holding the side of the roof panel 2 with the other hand 6. The user then applies sufficient force on the handle 12 in an upward direction, using hand 6 as a pivot point, to remove the panel 2 from the vehicle. In this fashion, with one hand 4 on the strap 12 and the other hand 6 on a side edge of the roof panel 2, the user is able to remove the roof panel 2 from the vehicle with limited strain on the back and, once removed, efficiently manipulate the roof panel 2 to any desired position. Any slipping of the straps 14, 16 can be prevented by positioning hand 6 over one of the straps 14, 16 at the side edge of the roof panel 2 before and during lifting.

It is possible to store the roof panel 2 in the trunk of the vehicle 1 or in another location and leave the harness 10 installed on the panel 2 in order to allow for quick reinstallation of the panel 2 in the event of a rain storm, or other situation. It is recommended, however, that the tension in straps 14, 16 be relieved or reduced (by operating the spring biased clamping arm 24) when storing the harness 10 on the panel 2 to an amount just sufficient to hold the harness 10 on the roof panel 2. In this fashion, the individual 3 will generally not deform the weather stripping 5 on the lateral side edges of the panel 2 and thereby affect the fit between the side windows of the vehicle 1 and the weather stripping 5.

From the above description it is seen that the present invention provides an improved method and apparatus for removing roof panels from automobiles. Those skilled in the art will appreciate that numerous modifications and/or additions can be made to the disclosed invention without departing from the spirit and scope thereof. For example, those skilled in the art will readily appreciate that it is possible to provide for a single clamping mechanism which grasps both ends of the straps 14, 16, thus eliminating one of the clamps 20. Further, it would be possible to provide a fabric layer stretching between the straps 14, 16 in order to provide a protective cover for the panel 2 of the vehicle 1. In addition, any desirable materials can be used to produce the apparatus of the present invention. While the preferred embodiment incorporates metal clamps and nylon strapping, those skilled in the art will readily appreciate that, due to advances in plastics and fabric materials, it may be possible to make the clamps 20 out of plastic and the material forming the harness 10 from other desirable man-made and natural materials, such as leather, rubber, plastic, etc. The present inventor intends that all such modifications and/or additions fall within the scope of the present invention which is best defined by the claims that appear below.

I claim:

1. A portable roof panel harness for removing a removable roof panel of an automobile comprising:

a plurality of flexible roof panel straps, each strap having a length sufficient to encircle the roof panel in a direction perpendicular to a lengthwise axis of the automobile;

a handle member connected between at least two of the plurality of flexible roof panel straps and selectively positionable on the roof panel, the handle member defining a connecting member for connecting the at least two roof panel straps; and a fastening mechanism disposed on a first end of at least one of the plurality of flexible roof panel straps, the fastening mechanism being releasably and adjustably engageable with a second end of the at least one flexible roof panel strap to removably secure the portable harness about the roof panel, wherein the handle member enables an individual to grab the handle member and remove the roof panel.

2. The portable harness of claim 1, wherein the plurality of flexible straps are made from nylon.

3. The portable harness of claim 2, wherein the handle member comprises a single nylon strap which is formed into a loop and is connected to the at least two of the plurality of flexible straps.

4. The portable harness of claim 3, wherein the handle member is connected to the at least two of the plurality of flexible straps using a stitch connection.

5. The portable harness according to claim 4, wherein the stitch connection is a boxed X stitch.

6. The portable harness of claim 5, wherein the stitch connection is formed using a polyester/cotton blend thread.

7. The portable harness according to claim 1, wherein the fastening mechanism comprises a clamp.

8. The portable harness according to claim 7, wherein the clamp comprises:

a rigid member having a plurality of eyelets formed therein; and a spring biased clamping arm connected to the rigid member, the clamping arm having a first and a second end, the first end being biased against at least one of the plurality of eyelets.

9. The portable harness of claim 8, wherein the first end of the spring biased clamping arm includes a plurality of gripping teeth formed thereon.

10. The portable harness of claim 9, wherein at least one of the plurality of eyelets of the rigid member is connected to the first end of the at least one flexible strap.

11. A method for removing a removable roof panel of an automobile comprising the steps of:

installing a portable harness having a plurality of flexible straps, each flexible strap having a length sufficient to encircle the roof panel in a direction perpendicular to a lengthwise axis of the automobile;

positioning a handle member connected between at least two of the plurality of flexible straps at a desired position on the roof panel;

engaging a fastening mechanism disposed on a first end of at least one of the plurality of flexible straps with a second end of the at least one flexible strap, the fastening mechanism being releasably and adjustably engageable with the second end of the at least one flexible strap to removably secure the portable harness about the roof panel; and removing the roof panel using the handle member.

* * * * *